United States Patent [19]
Kish

[11] 4,269,295
[45] May 26, 1981

[54] TORQUE TRANSMITTING FLUID COUPLINGS

[75] Inventor: Arthur S. Kish, Lyndhurst, Ohio

[73] Assignee: Murray Corporation, Cockeysville, Md.

[21] Appl. No.: 62,753

[22] Filed: Aug. 1, 1979

[51] Int. Cl.³ .................... F16D 35/00; F16D 43/25
[52] U.S. Cl. ................................ 192/58 B; 192/82 T
[58] Field of Search .................. 192/58 B, 82 T; 29/156.8 FC; 403/336

[56] References Cited

U.S. PATENT DOCUMENTS

| | | | |
|---|---|---|---|
| 3,191,733 | 6/1965 | Weir | 192/58 B |
| 3,328,058 | 6/1967 | Gundlach | 403/336 |
| 3,410,995 | 11/1968 | Gray | 403/336 X |
| 3,559,785 | 2/1971 | Weir | 192/58 B |
| 3,587,800 | 6/1971 | Crawford | 192/58 B |
| 3,968,866 | 7/1976 | Leichliter et al. | 192/82 T X |
| 3,983,980 | 10/1976 | Weintz | 192/82 T X |
| 4,132,299 | 1/1979 | Rohrer et al. | 192/58 B |
| 4,190,140 | 2/1980 | Konkle et al. | 29/156.8 FC X |

FOREIGN PATENT DOCUMENTS

677019   8/1952   United Kingdom .................. 192/58 B

*Primary Examiner*—Rodney H. Bonck
*Attorney, Agent, or Firm*—Isler and Ornstein

[57] ABSTRACT

Torque transmitting fluid couplings of two types are described, one a thermatically controlled coupling and the other a torque limiting coupling. Both are characterized by the use of parts which can be manufactured at low cost and easily and quickly assembled, and contribute to greater efficiency in operation than fluid couplings of these types which have heretofore been marketed. Both utilize a housing or casing which is die-cast complete and finish bored, a drive shaft and coupling flange made of two separate pieces, which are welded together, ball bearing mounts, a cover or cover member made as a metal stamping, and a drive disc which is die-cast, in a single piece, to provide a friction ring and friction segments molded integrally therewith. In the thermatically-controlled type, the cover is part of a cover assembly, which comprises a bracket for supporting a bimetal strip, a steel guide bushing riveted to the cover and in which a piston or pin is adapted to be slidably mounted, and a rubber piston seal for preventing leakage of fluid through the cover. The thermatically-controlled type also includes a plate and spring assembly, comprising a divider plate made as a steel stamping and a spring made of spring steel and supporting a weir made of a graphite-filled material.

7 Claims, 12 Drawing Figures

TORQUE TRANSMITTING FLUID COUPLINGS

BACKGROUND OF THE INVENTION

This invention relates, as indicated, to torque transmitting fluid couplings, but has reference more particularly to the type of fluid coupling disclosed in Weir U.S. Pat. No. 3,191,733.

In the aforesaid patent, a fluid coupling assembly is disclosed comprising a housing or casing having a hub for rotatably mounting the casing on a drive shaft, a bearing for supporting the casing on the drive shaft, a cover member, a divider plate and a drive disc.

The drive shaft is integrally connected with a coupling flange for coupling the drive shaft to any conventional part of an internal combustion engine, so that if the coupling unit is used for driving a cooling fan, the fan may be bolted to the housing or casing member and the coupling flange may be connected to the pulley which conventionally drives the engine water pump.

The peripheral edges of the cover member engage the peripheral edges of the divider plate, which, in turn, is seated on an annular surface adjacent the periphery of the casing, the cover member and divider plate being clamped to the casing by means of an annular flange of the casing which is swaged or otherwise formed into pressure engagement with the outer peripheral surface of the cover member.

The cover member and divider plate define a fluid reservoir, which is filled with a viscous fluid for driving the housing or casing. The housing or casing and divider plate define a drive chamber within which the drive disc is disposed, the drive disc being press-fitted or otherwise attached to the drive shaft.

The peripheral portions of the drive disc are covered with arcuate facing members, spaced from one another to provide grooves or channels extending between the outer portion of the facing members inwardly across the entire width of the facing members.

The drive disc is provided with a series of circumferentially-spaced ports which extend completely through the disc and are located adjacent the inner margins of the facing members, these grooves and ports providing toroidal circulation of fluid about the peripheral portion of the drive disc, as described in U.S. Pat. No. 2,879,755.

The assembly further includes a resilient blade or spring which is riveted to the inner face of the cover member, a bracket mounted on the exterior face of the cover member, a thermally responsive element in the form of a bimetal strip mounted on the bracket and a thrust member or pin interposed between the bimetal strip and the blade.

Pump means are provided for transferring fluid between the reservoir and the drive chamber, said means comprising an abutment member or weir of cylindrical configuration which extends into but is movable within an aperture in the divider plate. This aperture is extended to form a port which provides fluid communication between the reservoir and the drive chamber, the abutment member trailing the port in the direction of rotation of the divider plate with relation to the drive disc.

The position of the abutment member is controlled by the aforesaid resilient blade, to which the abutment member is secured. The position of the blade is controlled by the bimetal strip, which is so arranged that upon an increase in temperature ambient to the bimetal strip, the central portion of the strip bows outwardly and bears against one end of the thrust member, the other end of which bears against the blade. The mounting of the blade is such that its inherent resiliency urges it against the inner end of the thrust member.

In operation, the reservoir is filled with a fluid, such for example, as an oil, to a degree sufficient to fill the spaces in the drive chamber between the opposing surfaces of the facings and the adjacent walls of the divider plate and the casing or housing. Preferably, the minimum quantity of fluid is such that fluid may flow through the apertures in the drive disc providing the toroidal heat dissipating circulation of fluid, which has been mentioned. With the cover or housing rotating, centrifugal force distributes the fluid to a uniform level within the reservoir and the drive chamber, the fluid passing freely through the port. The rotational speed of the casing or housing, as compared to the rotational speed of the drive shaft, that is, the degree of coupling between the two, is dependent upon the amount of fluid in the drive chamber.

When the temperature ambient to the bimetal strip is relatively high, indicating that a maximum degree of coupling between the casing or housing and the drive shaft is desirable, the inner face of the abutment member does not extend into the path of fluid in the drive chamber, and therefore the pumping means formed by the abutment is inactive and centrifugal force maintains the fluid level uniform within the drive chamber and reservoir, the drive chamber, under these conditions, having a maximum amount of fluid therein and therefore a relatively high degree of coupling between the drive shaft and the casing or housing.

When the temperature, ambient to the bimetal strip decreases, indicating that a decreased degree of coupling between the drive shaft and the casing or housing is desirable, the central portion of the bimetal strip moves the thrust member inwardly and consequently the abutment member inwardly to position it so that it extends from the inner surface of the divider plate into the drive chamber and into the path of fluid in the drive chamber. With the abutment member thus positioned, it acts as an impact type pump, raising the fluid pressure in an area just ahead of, or leading, the abutment. The consequent increase in pressure in this area drives or pumps fluid from the drive chamber through the port and into the reservoir thereby reducing the volume of fluid in the drive chamber and, as a result, the degree of coupling between the drive shaft and the casing or housing. This movement of the abutment member places the pumping means in an active position in which it is capable of removing fluid from the drive chamber and transferring it through the port and into the reservoir.

SUMMARY OF THE INVENTION

The invention has, as its primary object, the provision of a torque transmitting fluid coupling which, from a functional standpoint, is similar to that of the aforesaid Weir patent, but in which various parts of the coupling are so designed and so manufactured as to substantially reduce the cost of manufacture and assembly of the coupling.

Another object of the invention is to utilize, in the manufacture of said parts, materials of lower cost than those previously used for such parts, as well as operations not heretofore used in manufacturing such parts, thereby effecting savings in both time and materials.

A further object of the invention is to provide a fluid coupling of the character described, in which greater accuracy is obtained in controlling the size or volume of the drive chamber.

Other objects and advantages of the invention will become more apparent and the invention itself will be best understood by reference to the following description of an embodiment of the invention taken in conjunction with the accompanying drawings.

DESCRIPTION OF THE PREFERRED EMBODIMENTS

Referring more particularly to FIGS. 1 to 9 inclusive of the drawings, the fluid coupling disclosed in these figures is of the thermally-controlled type, and comprises a housing or casing 10 having a hub 11 for rotatably mounting the housing on a drive shaft 12, a bearing 13 being provided for rotatably supporting the housing on the drive shaft.

Figure 1:
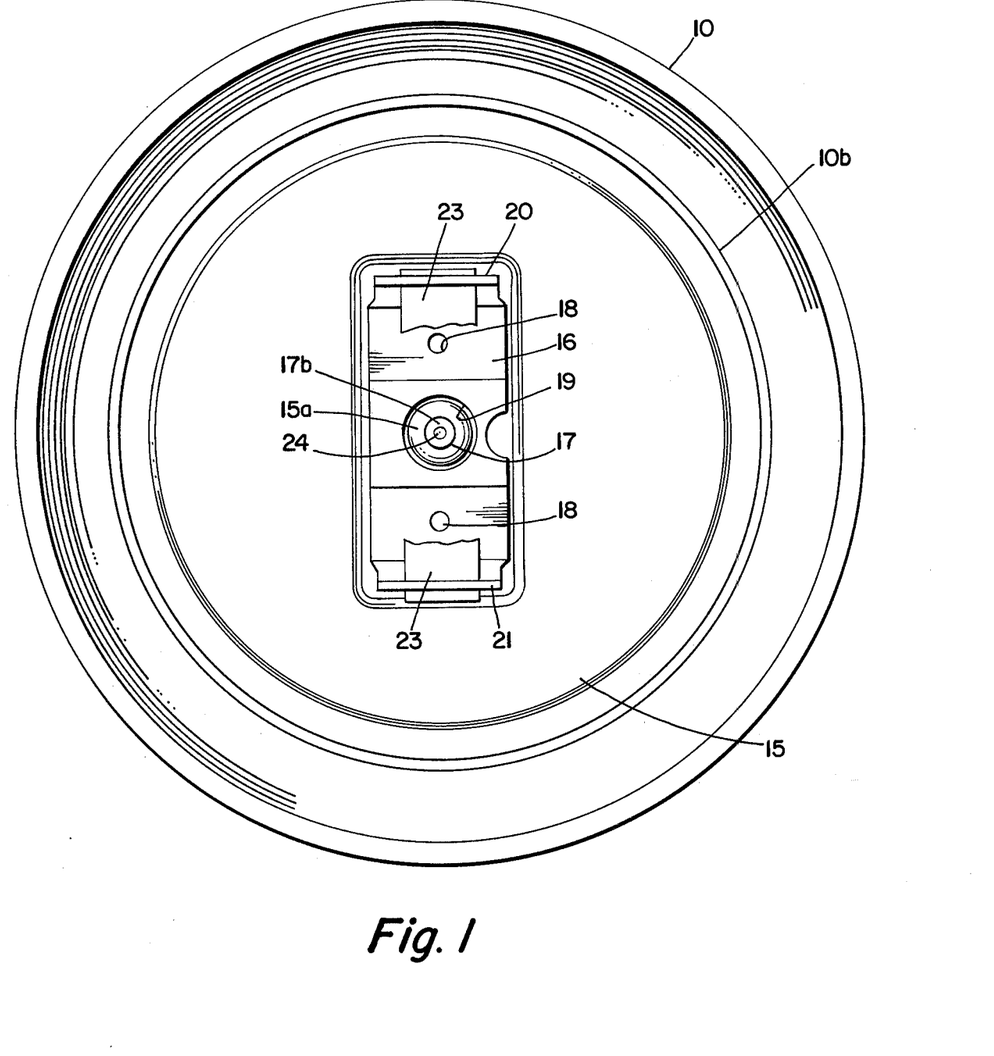
FIG. 1 is a front elevational view of a fluid coupling embodying the invention with a portion of the bimetal strip broken away to show the structure thereunder.
Figure 2:
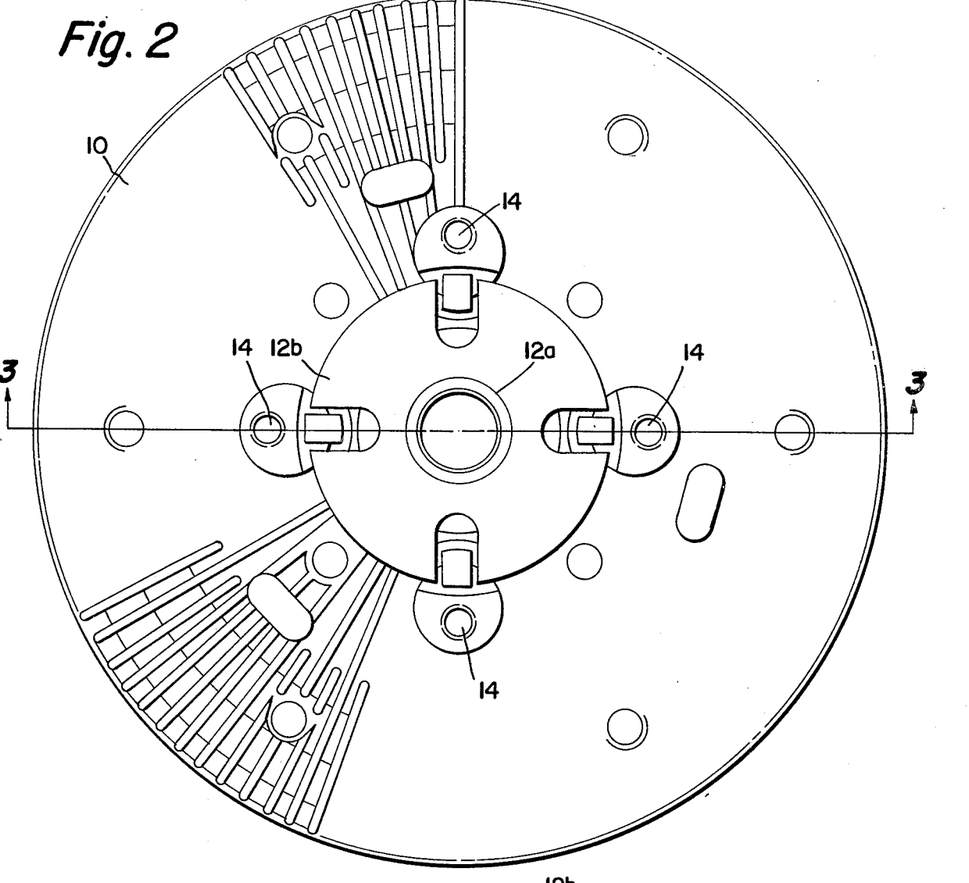
FIG. 2 is a rear elevational view of the fluid coupling.
Figure 3:
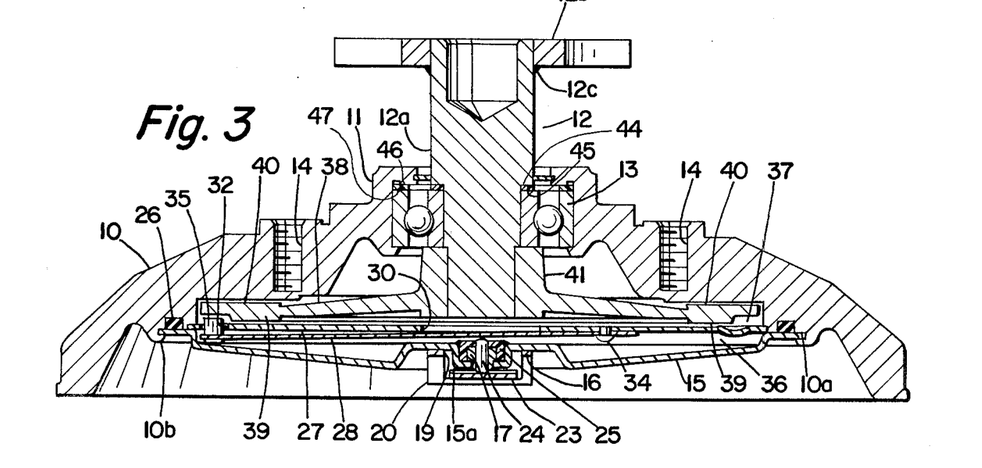
FIG. 3 is a cross-sectional view, taken on the line 3—3 of FIG. 2.

The housing 10 is die-cast complete and finish bored, as compared with the housing in the aforesaid Weir patent, which, as manufactured, is die-cast and then has all its inside surfaces machined. By eliminating the machining operations, a substantial savings in material and labor is effected.

In the drive shaft of the coupling in the aforesaid Weir patent, the shaft and the coupling flange were made as a single forging, which was then machined, hardened and ground. In the drive shaft of the present invention, the drive shaft and coupling flange are made in two separate pieces, the body 12a being made as a screw machine part which is ground, and the coupling flange 12b being a stamping, which is welded to the body, as at 12c. By utilizing such a two piece construction, a substantial savings in both labor and material is effected.

The bearing shown in the aforesaid Weir patent is a needle bearing, as compared with the bearing 13 of the present coupling, which is a ball bearing. The use of ball bearings permits the use of a more economical shaft assembly.

The coupling is utilized for driving a cooling fan (not shown) which may be bolted to the housing 10 by means of bolts threadedly engaging a plurality of circumferentially-spaced radially-disposed threaded bores 14, and the flange 12b may be connected to the pulley which conventionally drives the engine water pump.

The coupling includes a cover assembly, which is best seen in FIGS. 1, 3, 4 and 5, and which comprises a cover 15, a bracket 16 and a steel guide bushing 17.

The cover or cover member of the coupling in the aforesaid Weir patent was made as an aluminum die casting, as compared with the cover 15 of the present invention, which is a plated metal stamping, the use of which effects a substantial saving in cost of material.

The bracket 16 is spot-welded to the external face of the cover 15, as at 18 (see FIGS. 1 and 5), has a circular opening 19 at its center, and is bent at its ends to provide outwardly extending flanges 20 and 21.

By spot-welding the bracket to the cover, instead of staking the bracket to the cover, the use of a stamping for the cover is permitted, thereby effecting an economy of material and consequent savings in manufacture.

Figure 5:
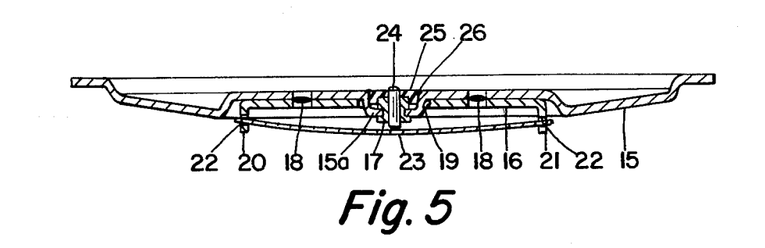
FIG. 5 is a cross-sectional view of the cover assembly, taken on the line 5—5 of FIG. 4.

The flanges 20 and 21 are slotted, as at 22, to receive the ends of a thermostatic element in the form of a bimetal strip 23, which is bowed outwardly, as best seen in FIG. 5.

The cover 15 is stamped or formed at its center to provide an embossment 15a (FIG. 4), having an aperture 15b through which a reduced portion 17a of the bushing 17 extends, this portion being riveted to the embossment 15a, as at 17b, to thereby lock the bushing to the embossment.

Figure 4:
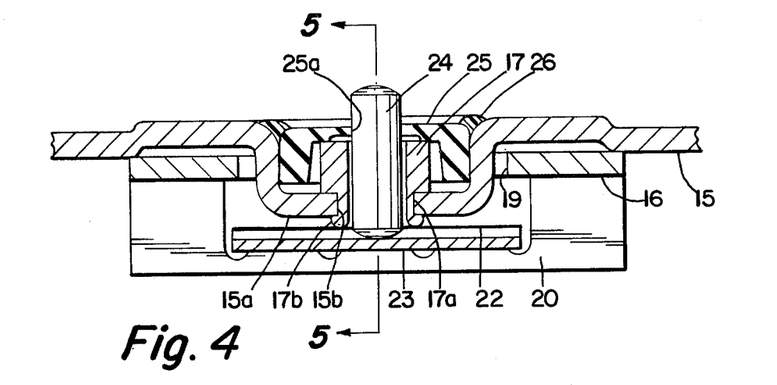
FIG. 4 is a fragmentary cross-sectional view, on an enlarged scale, of a portion of FIG. 3.

A thrust member, pin or piston 24 is slidably mounted in the bushing 17, for axial movement in the bushing. By using a riveted bushing to guide the piston or pin 24, greater accuracy in movement of the piston or pin is obtained.

For the purpose of sealing the cover 15 against leakage of fluid through the cover, in the area of the embossment 15a, a rubber piston seal 25 is provided, which, as best seen in FIG. 4, is of cup-like configuration, is frictionally mounted in the recess formed by the embossment 15a, and has a central opening 25a, through which the piston 24 extends, in frictional engagement with the wall of this opening.

After the seal 25 has been pressed into the position shown in FIG. 4, a bead 26 of General Electric RTV-112 adhesive sealer is applied to the periphery of the seal 25, to seal the space between the seal and the inner wall of the embossment 15a. This sealer cures at room temperature in 30 minutes.

The cover 15 is secured to the housing or casing 10, as by positioning the peripheral portion of the cover against an annular surface 10a of the casing (see FIG. 3), and swaging a portion of the casing into engagement with the cover as at 10b.

A leakproof seal between the casing 10 and cover 15 is effected by interposing a solid lathe cut gasket seal 26 (FIG. 3) of silicone rubber between the casing 10 and the peripheral or marginal portion of the cover 15. The use of such a gasket seal effects a saving in assembly time, as compared with the use of a paste-like sealing compound or sealer which has heretofore been used for sealing the cover to the casing, and which requires time to harden.

Figure 6:
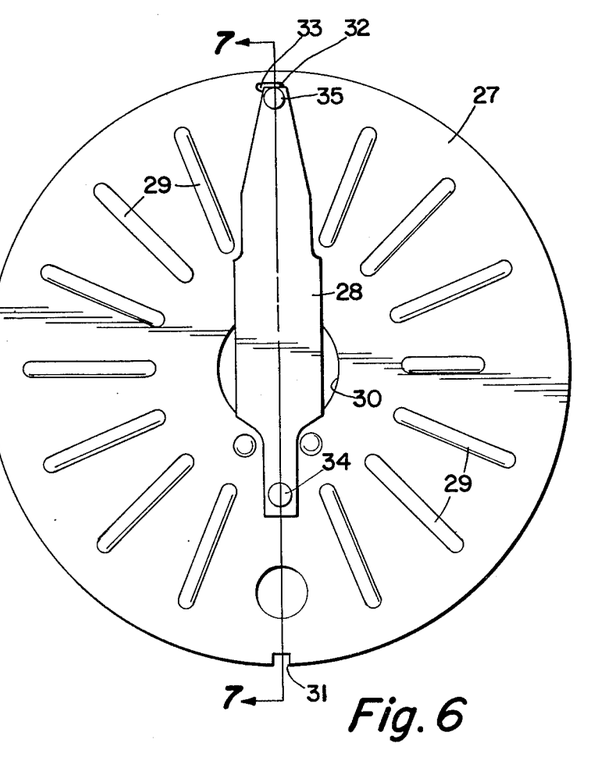
FIG. 6 is a front elevational view of the divider plate assembly.
Figure 7:
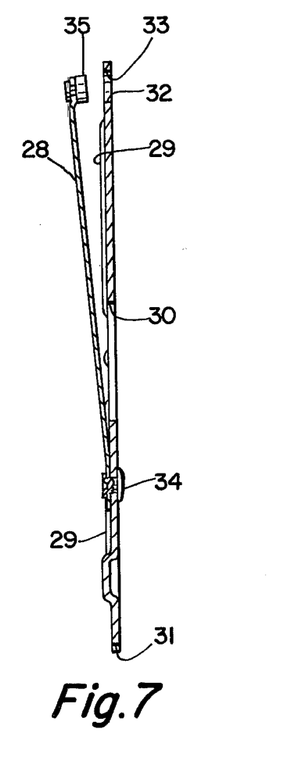
FIG. 7 is a cross-sectional view taken on the line 7—7 of FIG. 6.

The coupling further includes a plate and spring assembly, which, as best seen in FIGS. 3, 6 and 7, comprises a divider plate 27 and a spring 28.

The divider plate 27 is a steel stamping having circumferentially-spaced, radially-extending reinforcing ribs 29 stamped therein, and having an axial opening 30, and a notch or recess 31, adapted to receive a detent (not shown) on the housing or casing 10, for the purpose of locating the plate properly, circumferentially with respect to the housing or casing.

The plate 27 is provided adjacent one point adjacent its periphery with a circular aperture 32, which includes a further aperture portion forming a port 33 which serves a purpose to be presently described.

The spring 28 is made of spring steel, and is secured to the plate 27, in the position shown in FIGS. 3, 6 and 7, by means of a rivet 34. The free end of the spring 28 has riveted thereto an abutment member or weir 35 of slightly smaller diameter than that of the aperture 32, and which serves a purpose to be presently described. The weir 35 is made of Sivron or like material, which is 15% graphite filled.

The plate 27 is clamped at its periphery, between the casing 10 and the cover 15, and divides the space between the interior wall of the casing 10 and the inner face of the cover 15 into a fluid reservoir 36 and a fluid drive chamber 37 (FIG. 3).

Figure 8:
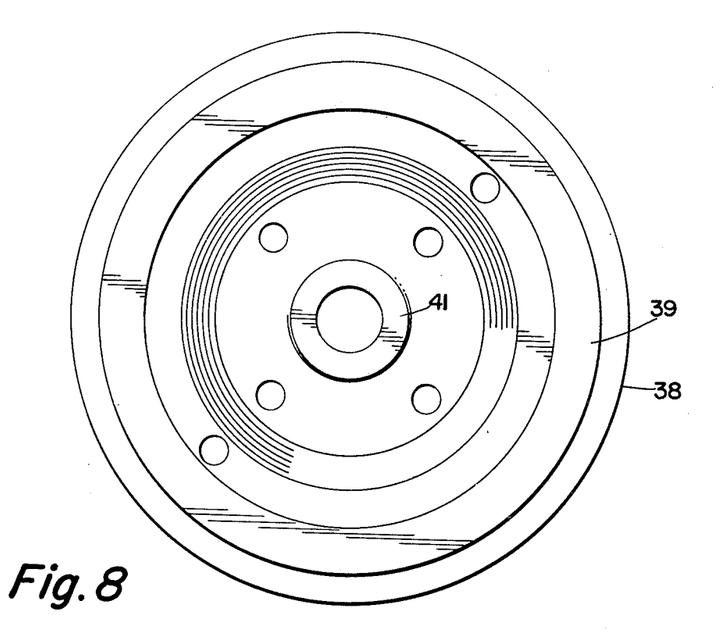
FIG. 8 is a front elevational view of the drive disc.
Figure 9:
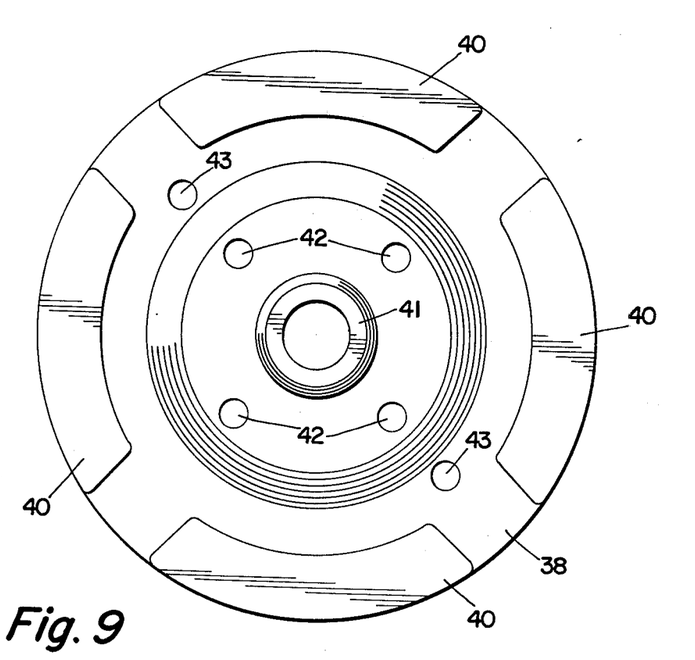
FIG. 9 is a rear elevational view of the drive disc.

The coupling further includes a drive disc 38 which is best seen in FIGS. 3, 8 and 9. This drive disc is die-cast complete and then bored, in contrast with the drive disc of the aforesaid Weir patent, which has heretofore been made as a stamping with segmental friction facings bonded to both faces thereof, and to which a hub was riveted and then finish bored. A primary advantage is the savings effected in time of assembly.

As seen in FIGS. 3, 8 and 9, the drive disc 38 is rigidly mounted on one end of the drive shaft 12a, and is die cast, in a single piece, to provide, on the face thereof adjacent the divider plate 27, a friction ring 39, molded integrally with the disc and on the opposite face thereof, circumferentially-spaced friction segments 40, which are also molded integrally with the disc.

The disc 38 has a hub or hub portion 41 molded integrally with the disc.

The disc 38 is also provided with a series of circumferentially-spaced apertures or ports 42, aligned with the spaces between the segments 40, and with two additional ports 43, also aligned with the spaced between segments 40, but disposed radially-outward from the ports 42. The function of these ports will be presently explained.

For the purpose of attaining a correct drive disc to housing or casing clearance, to thereby control the size or volume of the drive chamber, steel shims may be inserted between the bearing 13 and the end of the hub 41 which is adjacent the bearing. The use of such shims assures a uniform product, as well as accuracy in controlling the size of the shear chamber.

The operation of the aforesaid fluid coupling may be described as follows.

The reservoir 36 is filled with a fluid such, for example, as Dow Corning silicone oil 211, of 6000 Centistoke viscosity, to a degree sufficient to fill the spaces in the drive chamber 37 between the opposing surfaces of the friction ring 39 and friction segments 40 and the adjacent walls of the divider plate 27 and the inner wall of the casing or housing 10. Preferably, the minimum quantity of oil is such that oil may flow through the apertures 42 in the drive disc 38. With the cover or housing 10 rotating, centrifugal force distributes the oil to a uniform level within the reservoir 36 and drive chamber 37, the oil passing freely through the port 33 in the divider plate 27. The rotational speed of the casing or housing 10, as compared to the rotational speed of the drive shaft 12, that is, the degree of coupling between the two, is dependent upon the amount of oil in the drive chamber 37.

When the temperature ambient to the bimetal strip 23 is relatively high, indicating that a maximum degree of coupling between the casing or housing 10 and the drive shaft 12 is desired, the inner face of the abutment member or weir 35 extends into the aperture 32 but does not extend into the path of oil on the drive chamber 37, and therefore the pumping means formed by the weir 35 is inactive, and centrifugal force maintains the oil level uniform within the drive chamber 37 and reservoir 36, the drive chamber, under these conditions, having a maximum amount of oil therein and therefore a relatively high degree of coupling between the drive shaft 12 and the casing or housing 10.

When the temperature ambient to the bimetal strip 23 decreases, indicating that a decreased degree of coupling between the drive shaft and the casing or housing is desired, the central portion of the bimetal strip moves the piston or pin 24 inwardly and consequently the abutment member or weir 35 inwardly to position it so that it extends from the inner surface of the divider plate 27 into the drive chamber 37 and into the path of oil in the drive chamber. With the abutment member or weir 35 thus positioned, it acts as an impact type pump, raising the oil pressure in an area just ahead of, or leading, the weir. The consequent increase in pressure in this area drives or pumps oil from the drive chamber 37 through the port 33 and into the reservoir 36, and, as a result, the degree of coupling between the drive shaft 12 and the casing or housing 10. This movement of the weir 35 places the pumping means in an active position in which it is capable of removing oil from the drive chamber 37 and transferring it through the port 33 and into the reservoir 36.

Referring to FIG. 3, it will be noted that a shaft gasket 44, of compressed asbestos, is interposed between the inner race of the bearing 13 and a shoulder 45 of the body 12a of the drive shaft 12, and that a second gasket 46, of compressed asbestos, is interposed between the outer race of the bearing 13 and the surface 47 of the hub 11 of the housing or casing 10. These compressed asbestos gaskets serve to prevent leakage of the silicone fluid from the clutch assembly past the outer race or the inner race of the ball bearing 13 when the ball bearing is press-fitted into the cavity of the hub 11. Any loss of such fluid could cause a fan clutch malfunction.

Figure 10:
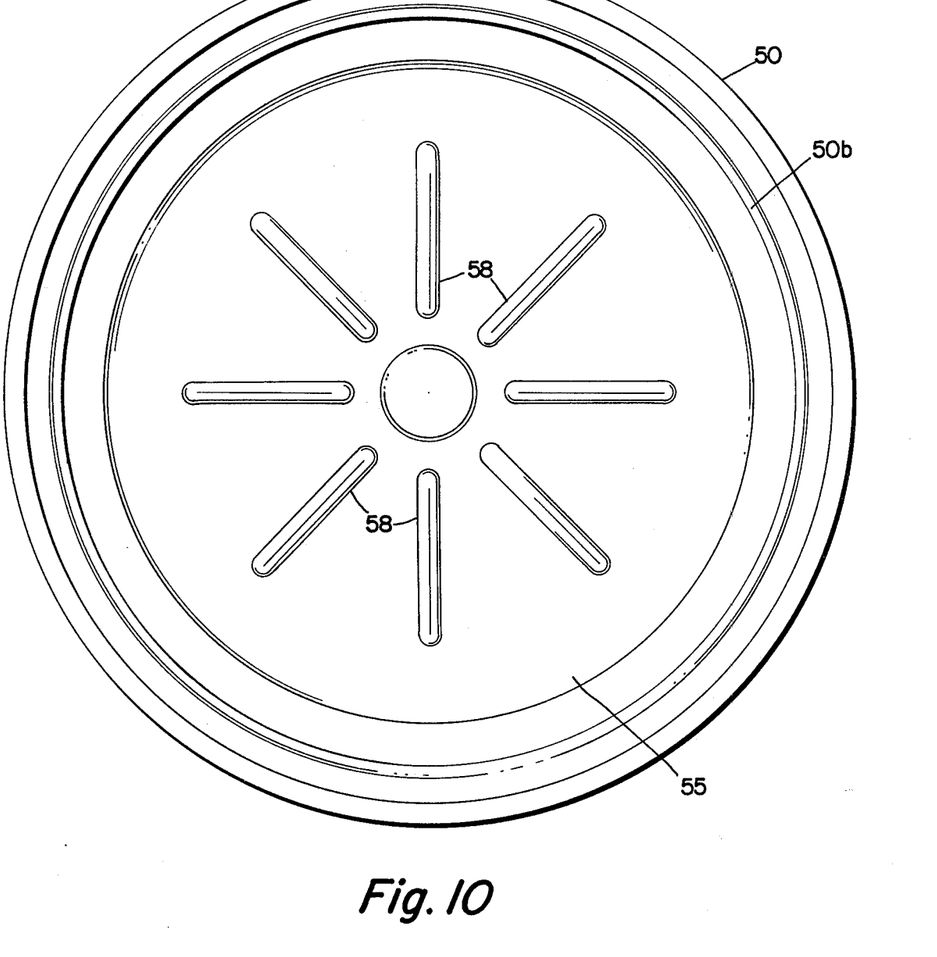
FIG. 10 is a front elevational view similar to FIG. 1, but showing a modified form of fluid coupling, which utilizes some of the features of the coupling shown in FIGS. 1 to 9 inclusive, and is a torque limiting coupling.
Figure 11:
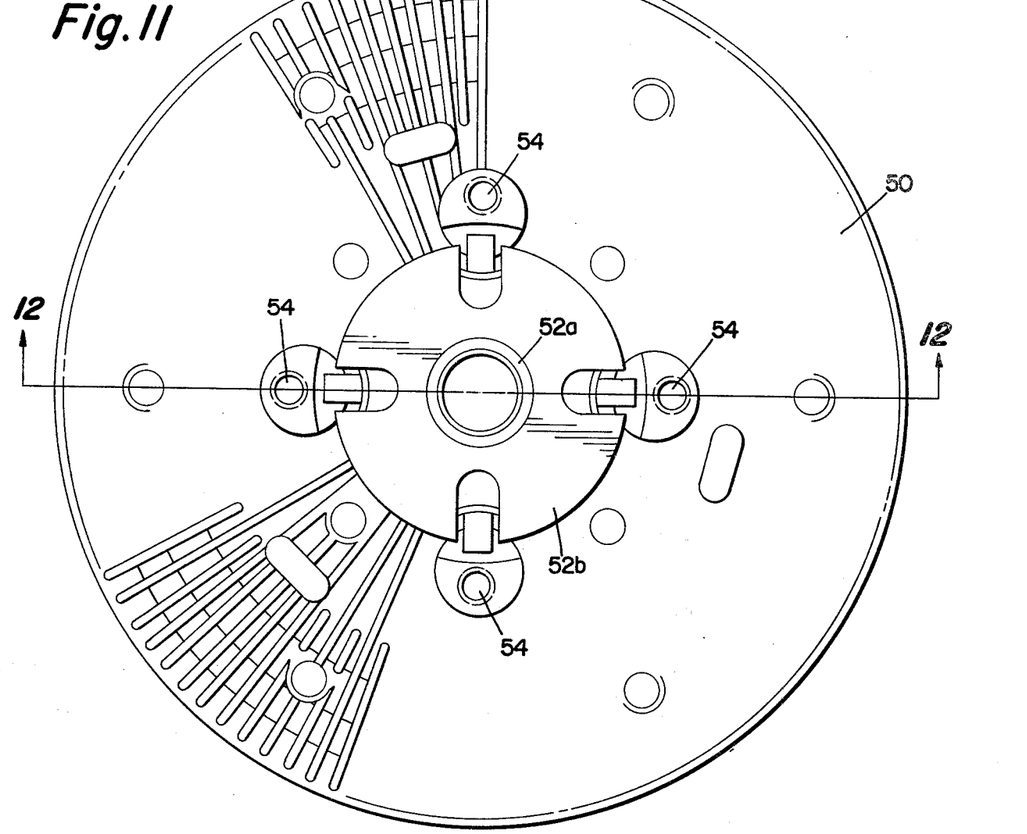
FIG. 11 is a rear elevational view of the coupling shown in FIG. 10.
Figure 12:
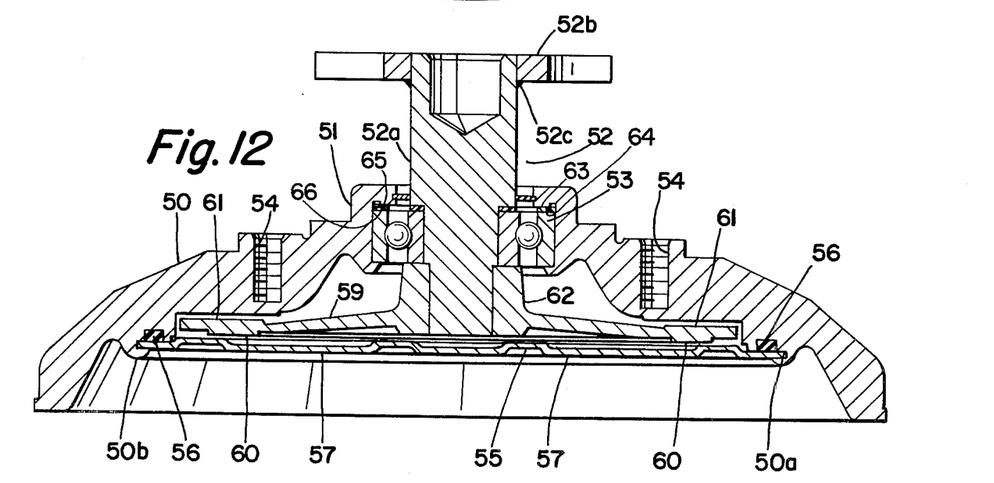
FIG. 12 is a cross-sectional view taken on the line 12—12 of FIG. 11.

In FIGS. 10, 11 and 12, a modification is illustrated, showing a torque limiting fluid coupling, in which some of the parts shown in the above-described coupling, are utilized.

Referring to these figures of the drawings, the coupling comprises a housing or casing 50, having a hub 51 for rotatably mounting the housing on a drive shaft 52, a bearing 53 being provided for rotatably supporting the housing on the drive shaft.

The housing 50 is die-cast complete and finish bored, as compared with the housing in the aforesaid Weir patent, which, as manufactured, is die-cast and then has all its inside surfaces machined. By eliminating the machining operations, a substantial savings in material and labor is effected.

In the drive shaft of the coupling in the aforesaid Weir patent, the shaft and the coupling flange were made as a single forging, which was then machined, hardened and ground. In the drive shaft of this modification, the drive shaft and coupling flange are made in two separate pieces, the body 52a being made as a screw machine part which is ground and the coupling flange 52b being a stamping, which is welded to the body, as at 52c. By utilizing such a two-piece construction, a substantial savings in both labor and material is effected.

The bearing shown in the aforesaid Weir patent is a needle bearing, as compared with the bearing 53 of the present coupling, which is a ball bearing. The use of ball bearings permits the use of a more economical shaft assembly.

The coupling is utilized for driving a cooling fan (not shown) which may be bolted to the housing 50 by means of bolts threadedly engaging a plurality of circumferentially-spaced radially-disposed threaded bores 54, and the flange 52b may be connected to the pulley which conventionally drives the engine water pump.

The coupling includes a cover which is best seen in FIGS. 10 and 12, and which comprises a cover 55.

The cover or cover member of the coupling in the aforesaid Weir patent was made as an aluminum die casting, as compared with the cover 55 of this modification, which is a plated metal stamping, the use of which effects a substantial saving in cost of material.

The cover 55 is secured to the housing or casing 50, as by positioning the peripheral portion of the cover against an annular surface 50a of the casing (see FIG. 12), and swaging a portion of the casing into engagement with the cover, as at 50b.

A leakproof seal between the casing 50 and the cover 55 is effected by interposing a solid lathe cut gasket seal 56 (FIG. 12) of silicone rubber between the casing 50 and the peripheral or marginal portion of the cover 55. The use of such a gasket seal effects a saving in assembly time, as compared with the use of a paste-like sealing compound or sealer which has heretofore been used for sealing the cover to the casing and which requires time to harden.

The cover 55 is also provided with a series of circumferentially-spaced, radially-extending reinforcing ribs 58 stamped therein.

The coupling further includes a drive disc 59 which is best seen in FIG. 12. This drive disc is similar in all respects to the drive disc 38 and is die cast complete, and then bored, in contrast with the drive disc of the aforesaid Weir patent, which has heretofore been made as a stamping with segmental friction facings bonded to both faces thereof, and to which a hub was riveted and then finish bored. A primary advantage is the savings effected in time of assembly.

As best seen in FIG. 12, the drive disc 59 is rigidly mounted on one end of the drive shaft 52a, and is die-cast in a single piece to provide, on the face thereof adjacent the cover 55, a friction ring 60, molded integrally with the disc, and on the opposite face thereof, circumferentially-spaced friction segments 61, which are also molded integrally with the disc.

The disc 59 has a hub portion 62 molded integrally with the disc.

The disc 59 is also provided with a series of circumferentially-spaced apertures or ports (not seen), similar to the ports 42 in FIGS. 8 and 9, aligned with the spaced between the segments 61, and with two additional ports (not seen), similar to the ports 43, also aligned with the spaces between the segments 61, but disposed radially-outward from the first-named ports.

Referring to FIG. 12, it will be noted that a shaft gasket 63, of compressed asbestos, is interposed between the inner race of the bearing 53 and a shoulder 64 of the body 52a of the drive shaft 52, and that a second gasket 65, of compressed asbestos, is interposed between the outer race of the bearing 53 and the surface 66 of the hub 51 of the housing or casing 50. These compressed asbestos gaskets serve to prevent leakage of the silicone fluid from the clutch assembly past the outer race or the inner race of the ball bearing 53, when the ball bearing is pressfitted into the cavity of the hub 51. Any loss of such fluid could cause a fan clutch malfunction.

While preferred embodiments of the invention have been shown and described, various modifications and substitutions may be made thereto without departing from the spirit and scope of the present invention. Accordingly it is to be understood that the present invention has been described by way of illustration and not limitation.

It is to be understood that the form of my invention herewith shown and described, is to be taken as a preferred example of the same, and that various changes may be made in the shape, size and arrangement of parts thereof, without departing from the spirit of the invention or the scope of the subjoined claims.

Having thus described my invention, I claim:

1. In a torque transmitting fluid coupling of the character described, a drive shaft assembly, a housing rotatably mounted on said drive shaft assembly, a cover secured to said housing, a drive disc within said housing driven by said drive shaft assembly, said housing consisting of a die casting having an unmachined internal surface, said cover consisting of a metallic stamping, said drive shaft assembly consisting of a body and a coupling flange, said body being a screw machine part, said coupling flange being a metallic stamping, which is welded to one end of said body, a bracket spot-welded to the exterior face of said cover, a bimetal strip secured to said bracket, said cover provided at its center with an embossment, forming a recess, a steel bushing mounted in said recess, and riveted to the embossment, a piston pin slidably mounted in the bushing, a cup-shaped rubber-like piston seal mounted in said recess, and an adhesive sealer applied to the periphery of the seal to seal the space between the seal and the inner wall of the embossment.

2. A torque transmitting fluid coupling, as defined in claim 1, including a solid lathe cut gasket seal of silicone rubber interposed between said housing and the marginal portion of said cover.

3. A torque transmitting fluid coupling, as defined in claim 2, wherein said drive disc is a casting, die-cast in a single piece, to provide on one face thereof a friction ring molded or cast integrally with the disc, and on the opposite face thereof, a plurality of circumferentially-spaced, arcuate, friction segments molded or cast integrally with the disc.

4. A torque transmitting fluid coupling, as defined in claim 3, including a plate and spring assembly disposed between said cover and drive disc, comprising a divider plate and a spring, said divider plate being a steel stamping having circumferentially-spaced, radially-extending reinforcing ribs stamped therein and having an axial opening, and said spring being made of spring steel.

5. A torque transmitting fluid coupling, as defined in claim 4, wherein said divider plate is provided at one point adjacent its periphery, with a circular aperture, and with a further aperture extending from the circular aperture and forming a port interconnecting the spaces at opposite sides of the plate.

6. A torque transmitting fluid coupling, as defined in claim 5, wherein said spring is riveted to said divider plate at a point adjacent said axial opening which is opposite that at which said circular aperture is disposed.

7. A torque transmitting fluid coupling, as defined in claim 6, wherein the free end of said spring has secured thereto an abutment member or weir of slightly smaller diameter than the circular aperture and is adapted for movement in said aperture.

* * * * *